United States Patent [19]

Kober et al.

[11] 4,070,162

[45] Jan. 24, 1978

[54] METHOD OF AGGLOMERATING PARTICLES IN GAS STREAM

[75] Inventors: Alfred E. Kober, Hopatcong; Ira Kukin, West Orange, both of N.J.

[73] Assignee: Apollo Chemical Corporation, Whippany, N.J.

[21] Appl. No.: 710,650

[22] Filed: Aug. 2, 1976

[51] Int. Cl.$^2$ .............................................. B03C 3/01
[52] U.S. Cl. ............................................ 55/5; 55/11; 55/262; 55/267; 55/DIG. 25
[58] Field of Search ................... 55/1, 5, 11, 261, 262, 55/267, DIG. 25; 209/5; 201/3, 4; 264/117; 71/28; 423/215.5

[56] References Cited

U.S. PATENT DOCUMENTS

| | | | |
|---|---|---|---|
| 2,356,717 | 8/1944 | Williams | 55/5 |
| 2,979,421 | 4/1961 | Rissman et al. | 71/28 |
| 3,298,949 | 1/1967 | Nelson, Jr. | 71/28 |
| 3,485,014 | 12/1969 | Atsukawa et al. | 55/5 |
| 3,581,463 | 6/1971 | Roberts | 55/5 |
| 3,665,676 | 5/1972 | McKewen | 55/5 |
| 3,689,213 | 9/1972 | Goerrieri | 55/5 |
| 3,877,920 | 4/1975 | Carlberg | 71/28 |
| 3,951,638 | 4/1976 | Bradley | 71/28 |

FOREIGN PATENT DOCUMENTS

| | | | |
|---|---|---|---|
| 932,242 | 7/1963 | United Kingdom | 55/1 |

*Primary Examiner*—Frank W. Lutter
*Assistant Examiner*—David L. Lacey
*Attorney, Agent, or Firm*—James & Franklin

[57] ABSTRACT

The separation characteristics of particles entrained in a particle-laden gas for separation by the commonly used methods for removing particles from a gas stream are improved by injecting finely divided urea into the gas stream prior to its passage through the separator. The urea conditioner agglomerates the particles to facilitate their removal from the gas stream by the separator.

14 Claims, No Drawings

METHOD OF AGGLOMERATING PARTICLES IN GAS STREAM

BACKGROUND OF THE INVENTION

This invention relates generally to a method of separating particulate material from a gas stream and, more specifically, to a method of chemically conditioning a particle-laden gas stream to cause the suspended particles to agglomerate into larger particles so that they may be removed more efficiently by any of the commonly used methods for removing particles, e.g. fabric filters, inertial separators, and electrostatic precipitators.

As man becomes increasingly aware of the need to preserve and protect the quality of his environment, more stringent laws are being passed limiting the amount of particulate matter that may be released to the atmosphere during the mining, processing and consuming of various minerals, fuels, etc. In order to make is possible for industry to comply with these regulations, pollution control hardware companies have developed which offer various devices for removing particles from gas streams. Three types of separator devices that are widely used are fabric filters (bag houses), inertial separators (cyclones), and electrostatic precipitators.

Fabric Filters

When high collection efficiency for small particle size is required, fabric filters are often the method of choice for separating the dust from the air. The fabric is usually made into bags of tubular or envelope shape. The entire structure housing the bags is called a bag house.

Filter fabrics normally used to remove dust and fumes from air streams are usually woven with relatively large open spaces, sometimes 100 microns or larger in size. Since separation efficiencies for dust particles of 1 micron or less may exceed 90 percent, the filtering process obviously is not just simple sieving. Small particles are initially captured and retained on the fibers of the cloth by means of interception, impingement, diffusion, gravitational settling and electrostatic attraction. Once a mat or cake of dust is accumulated, further separation is accomplished by sieving as well as by the previously mentioned methods. The fabric then serves mainly as a supporting structure for the dust mat responsible for the high separation efficiency. Periodically the accumulated dust is removed for disposal by mechanical shaking or momentary "pulses" of high pressure air, etc. Some residual dust remains and serves as an aid to further filtering.

As one would expect, smaller particles are more difficult to separate than larger ones and any means of increasing the proportion of larger particles at the expense of the smaller particles would result in greater separation efficiency and/or smaller and less expensive filters.

Inertial Separators

Inertial separators are widely used for collecting medium (15–40 microns) and coarse-sized particles. Ordinary inertial separators are generally unsuitable for fine dusts or metallurgical fumes. Dusts with a particle size ranging from 5 to 10 microns are normally too fine to be collected efficiently. In some cases, however, small diameter, high efficiency cyclones can be effective in separating particles in the 5 micron range.

A cyclone, which is an inertial separator without moving parts, separates particulate matter from a gas stream by transforming the velocity of an inlet stream into a double vortex confined within the cyclone. In the double vortex the entering gas spirals downward at the outside and spirals upward at the inside of the cyclone outlet. The particles, because of their inertia, tend to move toward the outside wall, from which they are led to a receiver.

For high efficiency, the separating forces should be large and the dust removal effective so that separated dust is not re-entrained. In general, cyclone efficiency increases with an increase in one or more of the following: (1) density of the particulate matter, (2) inlet velocity of the cyclone, (3) cyclone body length, (4) number of gas revolutions, (5) ratio of cyclone body diameter to cyclone outlet diameter, (6) amount of dust entrained in carrier gas, (7) smoothness of inner cyclone wall, and (8) particle diameter.

Since smaller particles are more difficult to separate than larger ones, any means of increasing the proportion of larger particles at the expense of the smaller particles would result in greater separation efficiency and/or smaller and less expensive inertial separators.

Electrostatic Precipitators

Electrostatic precipitators are another conventional way of separating dust particles from a gas stream in which the particles are entrained. This apparatus utilizes a corona discharge to charge the particles passing through an electric field established by a plurality of discharge electrode wires suspended by insulators in a plane parallel to a grounded collecting electrode plate. The charged particles are attracted to the collector plate from which they may be then removed by vibrating or rapping the plate. Examples of this type of precipitator are found in U.S. Pat. Nos. 3,109,720 and 3,030,753.

Performance of an electrostatic precipitator is governed by the following equations:

$$\epsilon = 1 - e^{-AW/V}$$

or $$\ln(1-\epsilon) = -AW/V \tag{1}$$

where: $\epsilon$ = separation efficiency, $A$ = effective precipitator collecting electrode area, $V$ = velocity of gas flow through the precipitator, $e$ = natural logarithmic base, $W$ = effective migration velocity of particles toward the separating electrode.

Separation efficiency increases with an increase in the exponent $AW/V$ and therefore with increased separating area, migration velocity and decreased precipitator throughput velocity. Migration velocity decreases proportionally with gas velocity and increases proportionally with precipitation field strength and with particle size, presumably because larger particles can pick up a greater number of charges.

Again, any means of increasing the proportion of larger particles at the expense of the smaller particles would result in an increase in migration velocity and hence in separation efficiency and/or smaller and less expensive electrostatic precipitators.

An article by E. C. Potter and C. A. J. Paulson, "Improvement of Electrostatic Precipitator Performance by Carrier-gas Additives and Its Graphical Assessment Using an Extended Deutsch Equation" in *Chemistry and Industry*, Volume 13 (July 6, 1974, pp. 532-533) claims that certain aliphatic amines, especially triethylamine, when injected into the flue gas of a coal-fired boiler "effectively increases particle size by agglomeration of suspended dust" (i.e. fly-ash). However, the authors' evidence for agglomeration is tenuous at best. They have extended the empirical Deutsch equation for precipitator efficiency by combining it with the expression $W = kaE_cE_p$ deduced from electrostatic theory and Stokes' Law. This yields the expression for separation efficiency, $\epsilon$, $$\ln(1-\epsilon) = kaa\, E_cE_p \qquad (2)$$

where $\alpha = A/V$, the separation area/unit gas throughput, $a$ = particle radius, $E_c$ = the charging field, and $E_p$ = the precipitating field. The factor $k = -3D/[6\pi\eta(D+2)]$, where D = the dielectric constant of the particle and $\eta$ is the viscosity of the carrier gas. Further they have assumed that (as is the case in most precipitator designs) the mean charging and precipitating fields, being of common electrical origin, are approximately the same and each is directly proportional to the applied voltage, V. This results, for a given composition of particle in the same carrier gas at constant temperature, in the following expressing for separation efficiency, $\epsilon$, $$\log(1-\epsilon) = Ka\alpha V^2 \qquad (3)$$

where $K$ = a constant, $V$ = the applied voltage, and $a$ and $\alpha$ are defined above. Thus a plot of log $(1-\epsilon)$ against $\alpha V^2$ should be a straight line with a slope directly proportional to the mean particle size.

Experiments in the authors' laboratory with an experimental coal combustion and precipitator rig using several different chemical additives showed an increase in precipitator performance and slope [plot of log $(1-\epsilon)$ vs. $\alpha V^2$] when triethylamine was injected in the flue gas; an increase in performance but no change in the slope when ammonia or sulfur trioxide were injected, and a decrease in both performance and slope when cyclohexylamine was injected. From the data the authors concluded that triethylamine caused agglomeration, cyclohexylamine caused dispersion or breaking up of agglomerates, and ammonia and sulfur trioxide, while having a positive effect on precipitator performance, did so by some mechanism other than agglomeration.

The major weaknesses of their approach are first, that the relationships derived are all based on the empirical Deutsch equation and, second, that in order for the slope of the plot to be dependent only on particle size $a$ both the constant K and the applied voltage V must be unaffected by the chemical treatment. The latter is not a valid assumption since K is dependent on the dielectric constant of the particles D, and since it is well known that the addition to a flue gas of chemical conditioning agents such as sulfur trioxide or ammonia has a major effect on the electrical properties of fly-ash therein.

Unequivocal methods of demonstrating agglomeration would be either to actually measure mean particle size of the fly-ash, with and without chemical treatment, or to use an inertial separator instead of an electrostatic precipitator to determine the effect of chemical conditioning on separation efficiency. While an improvement in separation efficiency of an electrostatic precipitator during chemical conditioning of particle-laden gas could be due to agglomeration, it could be also due to a space-charge effect or a change in the electrical properties of the collected fly-ash; an improvement in collection efficiency of an inertial separator during chemical conditioning could only be due to agglomeration.

Even if the effect of the injection of triethylamine into the particle-laden flue gas is, in fact, particle agglomeration, this process leaves much to be desired since triethylamine is a foul-smelling, toxic, volatile liquid and therefore difficult and dangerous to handle.

Accordingly, an object of the present invention is to provide an improved method of conditioning a particle-laden gas stream to improve the separation characteristics of the particles entrained therein.

Another object is to provide such a method which results in improved separation characteristics of the entrained particles regardless of which of the commonly used separation methods is employed.

A further object is to provide such a method which uses a chemical that is safe to handle, non-toxic and does not have deleterious effects on the environment.

A final object is to provide such a method which results in agglomeration of the entrained particles.

SUMMARY OF THE INVENTION

It has now been found that the above and related objects of the present invention are obtained by a method of conditioning a particle-laden gas comprising forming a mixture of the particle-laden gas and a conditioner comprising finely divided urea. Typically the gas is at a temperature of at least 150° C. and the mixture contains about 5–500 parts of conditioner per million parts by weight of the particle-laden gas. Preferably the gas is at a temperature of 300°–500° C at the time of mixing; and the mixture contains 30—60 parts of conditioner per million parts by weight of the particle-laden gas. The conditioner may be added to the gas in the form of either a dry urea powder or an aqueous urea solution (preferably at a 5–45% urea concentration by weight).

In a preferred embodiment, the separation characteristics of particles entrained in a particle-laden gas stream are improved for separation by a particle collector by injecting a conditioner comprising finely divided urea into a stream of particle-laden gas while the gas has a temperature of at least 150° C., preferably 300°–500° C. Sufficient conditioner is injected to provide 5–500, and preferably 30–60, parts of conditioner per million parts by weight of particle-laden gas. After injection, the gas stream is directed into the separator to collect the particles therein, the gas stream preferably passing through a heat exchange means.

DETAILED DESCRIPTION OF THE PREFERRED EMBODIMENTS

The conditioner useful in the present invention is finely divided urea ($NH_2CONH_2$). The conditioner may be utilized either in dry form (for example, as a powder of finely divided urea particles) or, preferably, as a solution (for example, as an aqueous solution readily prepared from ordinary tap water and a commercial grade of urea or by other conventional means for preparing an aqueous solution).

The amount of conditioner to be injected into the gas stream at the specified temperature varies according to the size, amount and type of solids entrained in the gas stream and the degree of improvement needed in the separator efficiency for example, in order to meet a maximum allowable emissions requirement of a local, state or federal regulatory body. Generally for conditioning the fly ash in a coal-burning utility boiler, sufficient conditioner is injected into the gas stream to provide about 5-500, and preferably 30-60, parts of conditioner per million parts by weight of particle-laden gas. Another way of expressing roughly the same injection level is about 35-7000, and preferably 210-840, grams of conditioner per metric ton of coal burned to form the flue gas (the exact quantity of flue gas formed by the coal depending on the coal composition). Generally conditioner levels below this range do not appreciably improve the separtion characteristics of the particles, while any conditioner levels in excess of the specified range not only increase the cost of conditioning unnecessarily, but also increase the possibility of blockage of the preheater or other heat exchanger downstream of the point of injection.

The quantity of conditioner determined according to the foregoing criteria is preferably added in the form of an atomized aqueous solution, preferably a 5-45% by weight solution. Higher or lower concentrations may be used, however, as the function of the water is merely to facilitate injection of the urea conditioner in atomized form into the gas stream, and the water itself is not believed to play a significant part in the process of the present invention.

The gas stream at the point of injection preferably has a temperature of at least 150° C, optimally 300°-500° C. Injection of the conditioner into the gas stream within the specified temperature ranges does not result in subsequent urea deposits in and/or blockage of the air preheater means downstream for two specific reasons. First, the urea has a decomposition temperature of 133° C. and its dispersal is enhanced by decomposition in the hot gas stream before it has an opportunity to reach the air preheater means. Second, the urea is of such high efficiency within the specified temperature range that only a small quantity need be injected.

It will be recognized that a critical feature of the present invention is the injection of the conditioner into a gas stream having the proper temperature range. The gas temperature at the point of injection must be sufficiently high to insure proper decomposition and dispersal of the conditioner prior to contact of the conditioner with the air preheater means or any other heat exchange unit which the conditioner might deposit upon and/or clog. When the gas stream at the point of injection is at least 150° C., the specified quantities of conditioner decompose and disperse with sufficient speed for this purpose. Of course, if there are no heat exchange units intermediate the point of injection and the collector, somewhat lower injection temperatures may be tolerated provided they are effective to decompose the conditioner prior to its contact with the separator. However, the presence of an air preheater means or other heat exchange unit intermediate the point of injection and the separator is preferred to insure complete and thorough mixing of the vaporized conditioner with the particles entrained in the gas stream. In this instance, it is recommended that the injection amount and injection temperature be appropriately coordinated (within the ranges specified for the practice of the present invention) to insure the absence of deposits in and clogging of the heat exchange unit, higher injection amounts requiring higher injection temperatures according to the principles of the present invention.

In a typical power station, the flue gas produced by a coal fired boiler passes successively from the boiler through a secondary superheater, a reheater-superheater, a "ball-room", a primary superheater, an economizer, an air preheater, a particle separator, a stack, and ultimately passes into the atmosphere. The temperature of the gas stream leaving the economizer is typically about 500° C., and the temperature of the gas stream entering the air preheater is typically slightly above 350° C. In this situation, the preferred location for the injection ports for the conditioner would be somewhere between the economizer exit and air preheater entry ducts. However, it is to be understood that this is only an illustrative example and that boilers vary widely in design and operating conditions. The criteria for selection of the injection ports is primarily the temperature of the gas stream at such points. Other criteria include the selection of a location permitting good mixing of the conditioner (preferably atomized) with the gas stream and the absence of direct impingement of the conditioner on the boiler tubing as that might result in severe damage by thermally shocking the boiler tubing. Preferably, the injection ports are disposed so that the gas stream (containing the conditioner) subsequently passes through the air preheater or some other heat exchange unit on its way to the separator to insure complete and thorough mixing of the conditioner and the particles entrained in the gas stream before the gas stream contacts the separator.

The apparatus for injecting the conditioner into the gas duct may be conventional in design. Apparatus for injecting the conditioner typically includes a supply of the conditioner, nozzle means communicating with the interior of the gas duct, and means connecting the conditioner supply to the nozzle means, such connecting means typically including means for forcing the conditioner through the nozzle, preferably as an atomized spray, and means for metering the amount of conditioner injected, typically in proportion to either the quantity of gas being conditioned or the quantity of fuel being burned.

Preferably the conditioner is injected on a continuous basis during operation of the furnace, but clearly, it may alternatively be injected on an intermittent or periodic basis.

The mechanism by which the conditioner of the present invention conditions the particles in the gas stream is clearly agglomeration as the conditioner is effective in fabric filters and inertial separators as well as in electrostatic precipitators. While it is doubted that the urea itself is the active agglomerating agent because the method is most efficient when the injection temperature is above the decomposition temperature of urea (133° C.), it is unclear exactly what is the chemical composition of the active agglomerating agent. It may be one or more of the decomposition products of urea (although it is not ammonia by itself) and/or a reaction product of one or more of the decomposition products (e.g., biuret, $NH_2CONHCONH_2$). Accordingly, it is to be understood that the term "conditioner" as it is used herein and in the claims encompasses both urea itself (for example, when the term is used to describe the conditioner being added to the gas stream) and a mixture of urea, its decomposition products and the reaction products of its decomposition products (for example, when the term is used to describe the quantity of conditioner to be found in the mixture after injection).

The efficiency of a particle separator can be determined by comparing the amount of particles or dust load released to the atmosphere from the separator outlet to the amount of particles or dust load entering the separator inlet. The following equation gives separator efficiency as a percentage:

$$\text{Efficiency} = \frac{P_i - P_o}{P_i} \times 100$$

where $P_i$ is dust load at the separator inlet and $P_0$ is dust load at the separator outlet. The dust loads, usually expressed as grains per cubic foot of gas, are conveniently measured by the procedure described in ASME Power Test Codes PTC 27-1957: *Determining Dust Concentration in a Gas Stream* and *Methods for Determination of Velocity, Volume, Dust and Mist Content of Gases,* Bulletin WP-50, 7th ed., Western Precipitation Division, Joy Manufacturing Company (1968).

The efficiency of the present invention is illustrated in the examples below, wherein all parts are by weight unless otherwise noted.

EXAMPLE I

A 21.5 megawatt balanced draft boiler was equipped with a Prat-Daniel tubular mechanical dust separator designed to collect fly ash particles of 10 micron diameter with an efficiency of 95%. Because of the age of the separator and possible changes in coal supply and mode of operation, the actual measured separation efficiency was well below the design level. In one instance urea was injected as an aqueous spray into a flue gas temperature zone of 315° C to 370° C prior to the separator; in another instance, as a control an ammonia generator (i.e., ammonium hydroxide) was similarly injected at a mole equivalent rate. The effects of such injections are recorded in Table I.

TABLE I

| Additive | Additive Treatment Rate, Grams/Metric Ton[1] | Theoretical NH$_3$ Level in flue gas, ppm wt.[2] | Separator Efficiency % |
|---|---|---|---|
| None | — | — | 67.0 |
| Urea[3] | 923 | 17 | 80.7 |
| NH$_3$ | 489 | 32 | 73.7 |

[1]Average coal consumption = 9.84 metric tons/hr.
[2]Assumes one molecule NH$_3$ from 1 molecule urea or 1 molecule ammonium hydroxide.
[3]Added as ammonium hydroxide.

The data recorded in Table I indicates that, although the ammonia level produced by addition of ammonium hydroxide to the flue gas was almost twice that producable by decomposition of urea, the effect of ammonium hydroxide on separator efficiency was far less than the effect of urea. Clearly, the improvement in separator efficiency observed during addition of urea is not due solely to generation of ammonia by thermal decomposition of the urea.

EXAMPLE II

A 44 megawatt boiler was equipped with an Aerotec tubular mechanical dust separator designed to collect fly ash particles of 10 micron diameter with an efficiency of 90%.

In this case the separator inlet was inaccessible because of the boiler configuration, and it was necessary to estimate the inlet dust load for use in efficiency calculations. The inlet dust load was estimated by using the coal consumption rate, ash content of the coal, and a factor of 60% for the amount of fly ash produced. Separator efficiencies were then calculated as in Example 1. Although efficiencies obtained by this technique may not be exact, relative values are significant since boiler conditions remained constant throughout the test.

The improvement in separator efficiency attained using urea is recorded in Table II along with a comparison of control results obtained using hexamethylene tetramine as an ammonia generator additive.

TABLE II

| Additive | Additive Treatment Rate Grams/Metric Ion[1] | Ash Content % | Estimated Inlet Dust Load, Pi[2], kg/hr | Measured Outlet Dust Load, Po, kg/hr | Separator Efficiency % |
|---|---|---|---|---|---|
| None | — | 10.5 | 1021 | 312 | 69 |
| Urea | 383 g/metric ton | 10.8 | 1050 | 218 | 79 |
| Urea | 719 | 10.7 | 1040 | 180 | 83 |
| Ammonia | 816[3] | 10.8 | 1050 | 337 | 68 |

[1]coal consumption = 16.2 metric tons/hour

[2]$P_i = 16,200 \frac{kg}{hr} \times \frac{\% \text{ ash}}{100} \times .60$

[3]added as 383g/metric ton of hexamethylene tetramine

The data in Table II illustrates the ability of urea to improve the efficiency of mechanical cyclone separators through agglomeration of fly ash particles. An increase in separator efficiency of 10–14% was obtained using urea conditioning. Again, this improvement in separator efficiency cannot be attributed to thermal decomposition of urea to ammonia, since the ammonia generator (hexamethylene tetramine) added at a rate equivalent to urea had no effect on collector efficiency.

To summarize, the present invention comprises a method of conditioning a particle-laden gas stream to improve separation characteristic of the particles entrained therein, by injection into the gas stream of a safe, non-odiferous, and environmentally-acceptable conditioner which results in agglomeration of the entrained particles and is thus useful regardless of which of the commonly used separator methods is employed.

We claim:

1. A method of conditioning a particle-laden gas comprising the step of forming a mixture of the particle-laden gas and a conditioner comprising finely divided urea, said mixture being at a temperature of at least 150° C., said conditioner being present in an amount sufficient to produce agglomeration of said particles.

2. The method of claim 1 wherein said mixture is at a temperature of 300°–500° C.

3. The method of claim 1 wherein said mixture contains 5–500 parts of said conditioner per million parts of weight of said gas.

4. The method of claim 3 wherein said mixture contains 30–60 parts of said conditioner per million parts by weight of said gas.

5. The method of claim 4 wherein said mixture is formed by injecting an aqueous solution of said conditioner into said gas.

6. The method of claim 4 wherein said mixture is formed by injecting a dry powder of said conditioner into said gas.

7. The method of claim 1 wherein said mixture is formed by injecting an aqueous solution of said conditioner into said gas.

8. The method of claim 7 wherein said aqueous solution comprises a 5-45% solution of said conditioner by weight.

9. The method of claim 1 wherein said mixture is formed by injecting a dry powder of said conditioner into said gas.

10. The method of claim 1 including the additional step of directing said mixture into a separation device to separate said particles from said mixture.

11. The method of claim 10 wherein said separation device is a fabric filter.

12. The method of claim 10 wherein said separation device is an inertial separator.

13. The method of claim 10 wherein said separation device is an electrostatic precipitator.

14. The method of claim 10 including the additional step of directing said mixture through heat exchange means prior to directing said mixture into said separation device.

* * * * *

Disclaimer and Dedication 4,070,162.—*Alfred E. Kober,* Hopatcong and *Ira Kukin,* West Orange, N.J. METHOD OF AGGLOMERATING PARTICLES IN GAS STREAM. Patent dated Jan. 24, 1978. Disclaimer and Dedication filed Mar. 10, 1983, by the assignee, *Economics Laboratory, Inc.*

Hereby disclaims and dedicates to the Public the entire remaining term of said patent.

[*Official Gazette September 27, 1983.*]